(12) United States Patent
Baek et al.

(10) Patent No.: US 12,003,034 B2
(45) Date of Patent: Jun. 4, 2024

(54) ANTENNA MODULE AND PORTABLE TERMINAL COVER HAVING SAME

(71) Applicant: AMOSENSE CO., LTD, Cheonan-si (KR)

(72) Inventors: Hyung Il Baek, Cheonan-si (KR); Kyung Hyun Ryu, Cheonan-si (KR); Chan Woo Lee, Cheonan-si (KR); Seung Yeob Yi, Cheonan-si (KR); Jae Il Park, Cheonan-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 308 days.

(21) Appl. No.: 17/606,291

(22) PCT Filed: Apr. 24, 2020

(86) PCT No.: PCT/KR2020/095077
§ 371 (c)(1),
(2) Date: Oct. 25, 2021

(87) PCT Pub. No.: WO2020/218912
PCT Pub. Date: Oct. 29, 2020

(65) Prior Publication Data
US 2022/0052452 A1 Feb. 17, 2022

(30) Foreign Application Priority Data
Apr. 26, 2019 (KR) .......................... 10-2019-0049346

(51) Int. Cl.
*H01Q 21/28* (2006.01)
*H01Q 1/38* (2006.01)
(Continued)

(52) U.S. Cl.
CPC ............... *H01Q 21/28* (2013.01); *H01Q 1/38* (2013.01); *H01Q 5/25* (2015.01); *H01Q 7/00* (2013.01)

(58) Field of Classification Search
CPC .. H01Q 1/38; H01Q 5/25; H01Q 7/00; H01Q 21/28
See application file for complete search history.

(56) References Cited

U.S. PATENT DOCUMENTS

2006/0170597 A1    8/2006   Kurashima et al.
2010/0220023 A1*   9/2010   Ge .......................... H01Q 19/26
                                                             343/700 MS
(Continued)

FOREIGN PATENT DOCUMENTS

CN             208173797 U     11/2018
KR    10-2006-0088073 A     8/2006
(Continued)

OTHER PUBLICATIONS

English Translation of KR20140086363A (Year: 2014).*
KR Office Action dated Dec. 13, 2023 as received in Application No. 10-2020-0050384.

*Primary Examiner* — Hoang V Nguyen
*Assistant Examiner* — Amal Patel
(74) *Attorney, Agent, or Firm* — Maschoff Brennan

(57) ABSTRACT

Suggested is an antenna module in which a radiation pattern for ultra-wideband communication and at least one of a radiation pattern for short-range communication, a radiation pattern for transmitting and receiving wireless power, a radiation pattern for electronic payment are integrally formed to enable communication with a vehicle. The suggested antenna module comprises: a first antenna having a first radiation pattern resonating in a first frequency band; and a second antenna disposed on one surface of the first antenna and having a second radiation pattern resonating in
(Continued)

a UWB frequency band different from the first frequency band. The first antenna includes a base substrate on which the first radiation pattern is formed and an extension substrate extending outward from the base substrate, and the second antenna is disposed on the upper surface of the extension substrate.

3 Claims, 5 Drawing Sheets

(51) Int. Cl.
*H01Q 5/25* (2015.01)
*H01Q 7/00* (2006.01)

(56) References Cited

U.S. PATENT DOCUMENTS

| | | |
|---|---|---|
| 2013/0141294 A1 | 6/2013 | Rappaport |
| 2017/0229900 A1* | 8/2017 | Cho .................. H02J 50/005 |
| 2018/0219400 A1* | 8/2018 | Jin ..................... H02J 50/10 |

FOREIGN PATENT DOCUMENTS

| | | | | |
|---|---|---|---|---|
| KR | 10-2010-0035914 A | | 4/2010 | |
| KR | 10-2014-0086363 A | | 7/2014 | |
| KR | 20140086363 A | * | 7/2014 | ........... H04B 5/0075 |
| KR | 10-2017-0080412 A | | 7/2017 | |
| KR | 10-2017-0093670 A | | 8/2017 | |
| KR | 10-2018-0049668 A | | 5/2018 | |
| KR | 10-2018-0057939 A | | 5/2018 | |

\* cited by examiner

[FIG. 1]
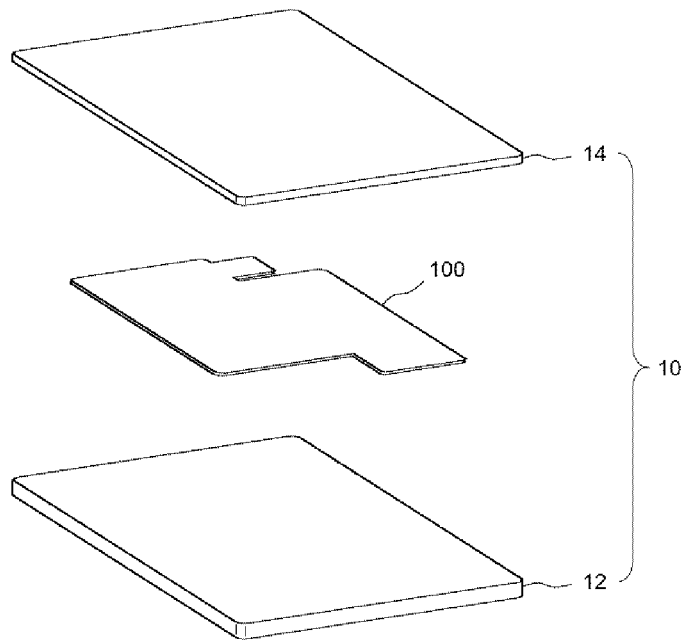
[FIG. 2]
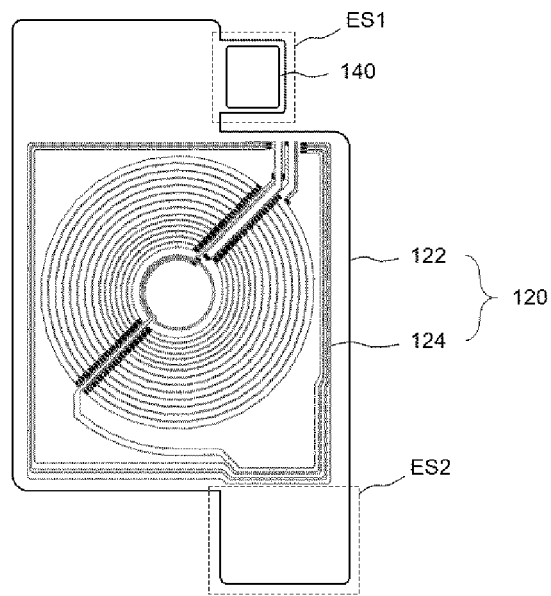

[FIG. 3]
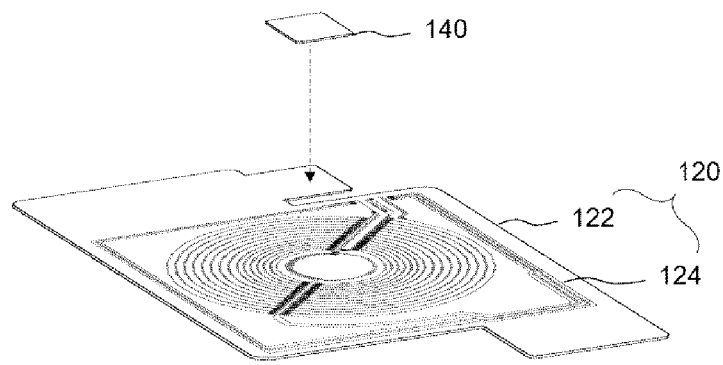
[FIG. 4]
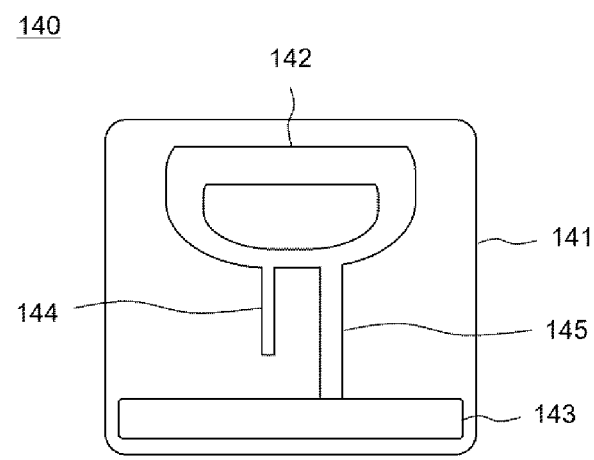

[FIG. 5]
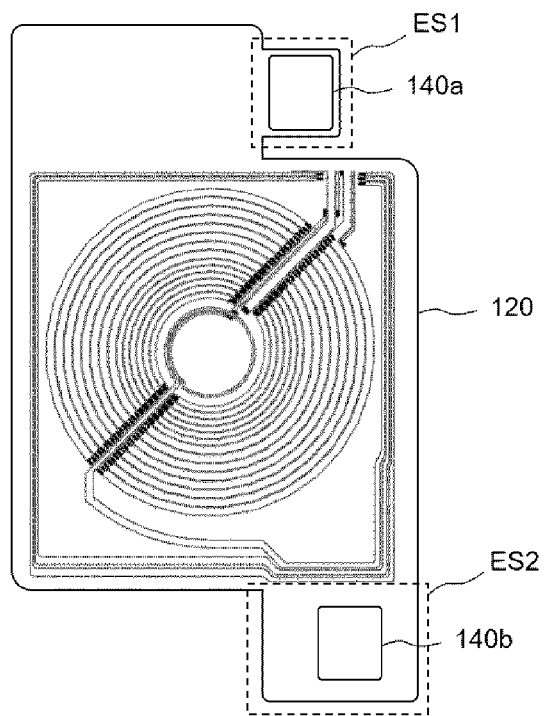

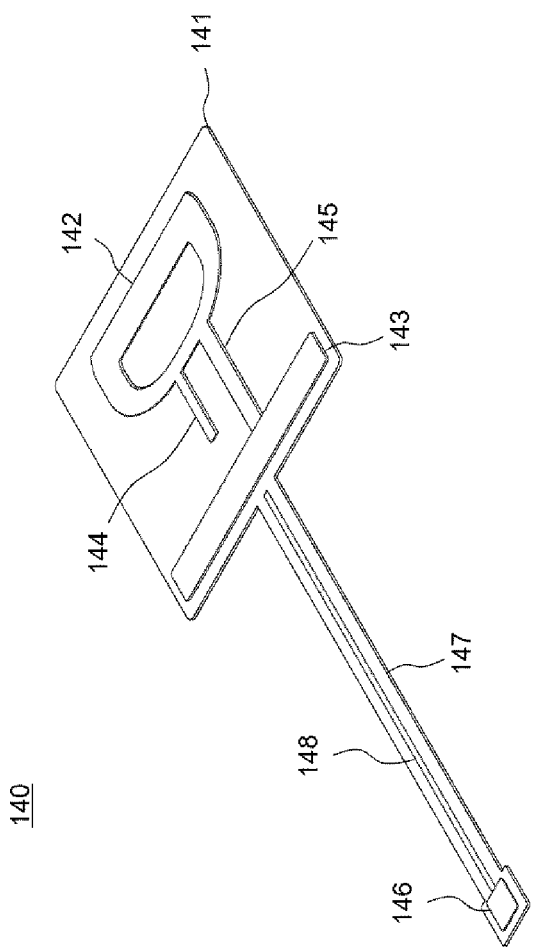
[Fig. 6]

[FIG. 7]
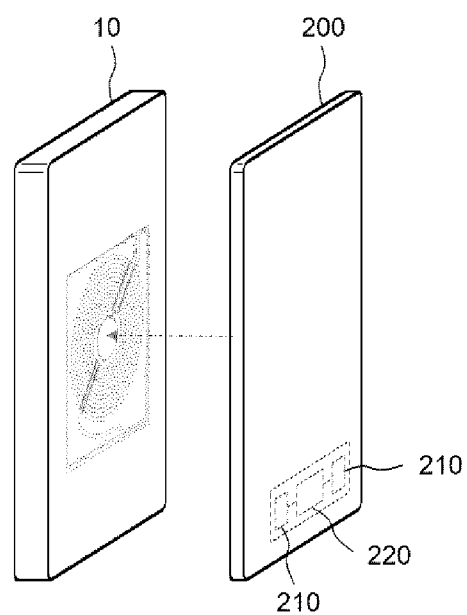

ANTENNA MODULE AND PORTABLE TERMINAL COVER HAVING SAME

TECHNICAL FIELD

The present disclosure relates to an antenna module and a portable terminal cover having the same, and more specifically, to an antenna module mounted on a portable terminal to transmit and receive data with a vehicle and a portable terminal cover having the same.

BACKGROUND ART

Recently, a vehicle provides various conveniences to a driver using a distance between the driver and the vehicle, a driver position, a vehicle position, etc. For example, the vehicle provides a function of guiding a path to a parked vehicle to the driver using the driver position and the vehicle position, a function of opening a door of the vehicle when the driver approaches the vehicle and locking the door of the vehicle when the driver moves away from the vehicle, etc. using a distance between the driver and the vehicle.

A conventional vehicle has used a low frequency (LF) or radio frequency (RF) communication to measure the distance between the driver and the vehicle, the driver position, and the vehicle position.

Recently, a position measuring technology using an ultra-wide band (UWB) communication is being applied to the vehicle. The UWB communication can provide wireless positioning and communication functions having high precision through an impulse signal. The UWB communication uses a frequency band of about 3.1 GHz to 10.6 GHz and has a transmission distance of about 10 m to 1 km. The UWB communication is advantageous for distance measurement due to its excellent time resolution with several nsec pulses, and can implement a low power of a low duty cycle.

Therefore, the UWB communication is applied to the position measuring field required for low-speed position recognition-based application services and the position measuring field having the precision of about +/−10 cm.

To this end, a research for mounting a second antenna on the portable terminal is performed to measure a relative position of the vehicle. As the second antenna mounted on the portable terminal, there are a UWB chip antenna, a laser direct structuring (LDS) antenna, etc.

However, there is a problem in that the performance is reduced when the UWB chip antenna is mounted on the portable terminal, and there is a problem in that the LDS antenna results in increasing in the price of the portable terminal due to its high price, and requires a space of a certain level or more, and therefore, is difficult to be mounted on the portable terminal due to an insufficient mounting space.

DISCLOSURE

Technical Problem

The present disclosure is proposed to solve the above conventional problems, and an object of the present disclosure is to provide an antenna module that has one or more of a near field communication radiation pattern, a wireless power transmission/reception radiation pattern, and an electronic payment radiation pattern and an ultra-wide band communication radiation pattern integrally formed thereon to enable the communication with a vehicle.

Further, another object of the present disclosure is to provide an antenna module that has a radiation pattern for a UWB frequency band formed on a base substrate with a low dielectric dissipation factor, and a connector formed on an extension substrate extending outward from the base substrate.

Further, still another object of the present disclosure is to provide a portable terminal cover, which is coupled to a portable terminal to support the communication between a vehicle and the portable terminal through a UWB frequency band.

Technical Solution

To achieve the objects, an antenna module according to an exemplary embodiment of the present disclosure includes a first antenna provided with a first radiation pattern resonating in a first frequency band and a second antenna disposed on one surface of the first antenna and provided with a second radiation pattern to resonate in a UWB frequency band different from the first frequency band, in which the first antenna comprises: a base substrate formed with the first radiation pattern and an extension substrate extending outward from the base substrate, and the second antenna is disposed on an upper surface of the extension substrate.

The base substrate can include a first extension substrate extending outward from one side surface of the base substrate and a second extension substrate spaced apart from the first extension substrate by a set interval or more, and extending outward from the other side surface of the base substrate, in which the second antenna can include a first UWB antenna disposed on an upper surface of the first extension substrate and a second UWB antenna disposed on an upper surface of the second extension substrate.

The second antenna can include a base sheet disposed on an upper surface of the extension substrate and a ground pattern disposed on one surface of upper and lower surfaces of the base sheet, and the second radiation pattern can be disposed to be spaced apart from the ground pattern on the upper surface of the base sheet. At this time, the second antenna can further include a feeding pattern disposed on the upper surface of the base sheet, and connected to the second radiation pattern and a connection pattern disposed on the upper surface of the base sheet, and connecting the second radiation pattern and the ground pattern.

To achieve the objects, an antenna module according to another exemplary embodiment of the present disclosure includes a flexible substrate; a UWB radiation pattern formed on the flexible substrate; an extension substrate extending outward from the flexible substrate; a connector formed on the extension substrate; and a connection pattern formed on the extension substrate to connect the UWB radiation pattern and the connector. At this time, the UWB radiation pattern can include a radiation pattern; a feeding pattern formed on the flexible substrate, and connected to the radiation pattern; a ground pattern formed on the flexible substrate and spaced apart from the radiation pattern; and another connection pattern formed on the flexible substrate, and connecting the radiation pattern and the ground pattern.

To achieve the objects, a portable terminal cover according to the exemplary embodiment of the present disclosure includes a UWB antenna and a signal processing circuit configured to process a signal transmitted and received by the UWB antenna, in which the UWB antenna includes a radiation pattern; a feeding pattern connected to the radiation pattern; a ground pattern spaced apart from the radiation pattern; and a connection pattern connecting the radiation pattern and the ground pattern. At this time, the UWB antenna can further include another radiation pattern.

The antenna terminal cover according to the exemplary embodiment can also further include another UWB antenna spaced apart from the UWB antenna, and connected to the signal processing circuit.

Advantageous Effects

According to the antenna module according to the present disclosure, it is possible to integrally form one or more of the near field communication radiation pattern, the wireless power transmission/reception radiation pattern, and the electronic payment radiation pattern and the UWB communication radiation pattern, thereby minimizing the mounting space and enabling the UWB communication between the vehicle and the portable terminal.

Further, the antenna module can have the UWB radiation pattern formed on the base substrate with the low dielectric dissipation factor, and have the connector formed on the extension substrate extending outward from the base substrate, thereby occupying the minimum space when mounted on the portable terminal and enabling the UWB communication.

Further, the portable terminal cover having the antenna module can be coupled to the portable terminal to support the communication between the vehicle and the portable terminal through the UWB frequency band.

DESCRIPTION OF DRAWINGS

FIG. 1 is a diagram for explaining an antenna module mounted on a portable terminal according to an exemplary embodiment of the present disclosure.

FIGS. 2 and 3 are diagrams for explaining the antenna module according to the exemplary embodiment of the present disclosure.

FIG. 4 is a diagram for explaining a second antenna according to the exemplary embodiment of the present disclosure.

FIG. 5 is a diagram for explaining an antenna module according to another exemplary embodiment of the present disclosure.

FIG. 6 is a diagram for explaining a modified example of the second antenna according to the exemplary embodiment of the present disclosure.

FIG. 7 is a diagram for explaining a portable terminal cover according to the exemplary embodiment of the present disclosure.

MODE FOR INVENTION

Hereinafter, the most preferred exemplary embodiments of the present disclosure will be described with reference to the accompanying drawings in order to specifically describe the exemplary embodiments such that those skilled in the art to which the present disclosure pertains may easily implement the technical spirit of the present disclosure. First, in adding reference numerals to the components of each drawing, it should be noted that the same components have the same reference numerals as much as possible even if they are illustrated in different drawings. Further, in describing the present disclosure, when it is determined that the detailed description of the related well-known configuration or function may obscure the gist of the present disclosure, the detailed description thereof will be omitted.

Referring to FIG. 1, an antenna module 100 according to an exemplary embodiment of the present disclosure is a combo antenna mounted inside a portable terminal 10. At this time, the combo antenna refers to an antenna disposed between a portable terminal body 12 and a rear cover 14 to include two or more radiation patterns resonating in different frequency bands.

For example, the antenna module 100 is a flexible printed circuit board including one or more of a near field communication (NFC) radiation pattern (hereinafter, referred to as "NFC radiation pattern"), a wireless power transmission/reception (WPC) radiation pattern (hereinafter, referred to as "WPC radiation pattern"), and an electronic payment (MST) radiation pattern (hereinafter, referred to as "MST radiation pattern") and an ultra-wide band communication (UWB) radiation pattern (hereinafter, referred to as "UWB radiation pattern").

One or more antenna anchors are installed in a vehicle, and the anchor transmits and receives a positioning signal and a response signal with an antenna resonating in the UWB frequency band to accurately detect a position of the vehicle. At this time, the position of the vehicle can be measured using a signal reception time of a positioning signal and a response signal transmitted and received by the UWB radiation pattern, a received signal strength (RSSI), etc. Here, the position of the vehicle is a relative position between the portable terminal 10 and the vehicle, and can include a distance, an angle, etc.

Referring to FIGS. 2 and 3, the antenna module 100 is configured to include a first antenna 120 and a second antenna 140.

The first antenna 120 is an antenna that resonates in one or more of the NFC frequency band, the WPC frequency band, and the MST frequency band. To this end, the first antenna 120 includes a base substrate 122, and a first radiation pattern 124 of one or more of the NFC radiation pattern, the WPC radiation pattern, and the MST radiation pattern is disposed on an upper surface of the base substrate 122.

The base substrate 122 can be formed of a thin film substrate such as a film, a sheet, or a thin film substrate. The base substrate 122 can be a flexible printed circuit board (FPCB). For example, the base substrate 122 is a polyimide (PI) sheet. Here, the base substrate 122 is not limited thereto, and can be variously used as long as it is the thin film substrate and can form the first radiation pattern 124 constituting the antenna.

The base substrate 122 includes an extension substrate having the second antenna 140 mounted (disposed) thereon. The extension substrate can be formed to extend outward from the base substrate 122, and can be integrally formed with the base substrate 122.

The second antenna 140 is an antenna that resonates in the UWB frequency band, and includes a second radiation pattern 142 that resonates in the UWB frequency band. The second antenna 140 can also include a plurality of second radiation patterns 142. The second antenna 140 can be disposed on an upper surface of at least one of the extension substrates extending outward from the base substrate 122.

For example, referring to FIG. 4, the second antenna 140 is configured to include a base sheet 141, the second radiation pattern 142, and a ground pattern 143.

The base sheet 141 is made of an insulating material or a dielectric material, and is formed in a plate shape having a predetermined shape. For example, the base sheet 141 is a polyimide sheet.

The base sheet 141 is disposed on the upper surface of the extension substrate extending outward from the base substrate 122. An adhesive sheet (not shown) is interposed between the base sheet 141 and the extension substrate, and the base sheet 141 is bonded to the upper surface of the extension substrate by the adhesive sheet.

The second radiation pattern 142 is made of a metal material such as copper and disposed on an upper surface of the base sheet 141. The second radiation pattern 142 is formed in various shapes in a virtual rectangular space on the base sheet 141. At this time, the second radiation pattern 142 is connected to a feeding source through a feeding pattern 144. Here, although it has been described that the second radiation pattern 142 is formed on the base sheet 141 and disposed on the extension substrate, the second radiation pattern 142 is not limited thereto, and can also be formed directly on the upper surface of the extension substrate.

The ground pattern 143 is made of a metal material such as copper and disposed on the upper surface of the base sheet 141. At this time, the ground pattern 143 is connected to the second radiation pattern 142 through a first connection pattern 145. Here, the ground pattern 143 can also be disposed on a lower surface of the base sheet 141, and is connected to the first connection pattern 145 formed on the upper surface of the base sheet 141 through a via hole. Here, although it has been described that the ground pattern 143 is formed on the base sheet 141 and disposed on the extension substrate, the ground pattern 143 is not limited thereto, and can also be formed directly on the upper or lower surface of the extension substrate.

Referring to FIG. 5, a plurality of second antennas 140 can be formed, and for example, the second antenna 140 is configured to include a first UWB antenna 140a and a second UWB antenna 140b.

The first UWB antenna 140a and the second UWB antenna 140b communicate with a UWB antenna (not shown) installed in the vehicle to detect an accurate position of the vehicle. The first UWB antenna 140a and the second UWB antenna 140b are disposed to be spaced apart from each other by a predetermined interval. The first UWB antenna 140a can be disposed on one side surface of the base substrate 122, and the second UWB antenna 140b can be disposed on the other side surface of the base substrate 122.

For example, the first UWB antenna 140a is formed on a first extension substrate ES1 extending outward from one side surface of the base substrate 122 on which the first antenna 120 is formed. The second UWB antenna 140b is formed on a second extension substrate ES2 extending outward from the other side surface of the base substrate 122. At this time, the first extension substrate ES1 and the second extension substrate ES2 are disposed to be spaced apart from each other by a predetermined interval.

Meanwhile, the antenna module 100 according to the embodiment of the present disclosure can be composed of the second antenna 140 and can also operate as an antenna communicating in the UWB frequency band having a bandwidth of about 6 GHz to 8 GHz. The flexible printed circuit board (FPCB) type mainly uses a coaxial cable type UWB antenna because it has the reduced antenna performance in the UWB frequency band. However, it is difficult for the coaxial cable type to be mounted on the portable terminal 10 because it is difficult to implement the thin film due to the thickness of the coaxial cable.

Therefore, referring to FIG. 6, the second antenna 140 can be formed of a single antenna of a jumper flex type. Here, the jumper flex type antenna is an antenna with a structure in which the radiation pattern and a connector 146 are formed on the flexible printed circuit board.

The second antenna 140 can be formed integrally with the UWB antenna and the connector 146. The second antenna 140 can be configured to include the flexible substrate (i.e., the base sheet 141), the UWB radiation pattern 142 formed on the flexible substrate 141, an extension substrate 147 extending outward from the flexible substrate 141, and the connector 146 formed on the extension substrate 147. A second connection pattern 148 connecting the UWB radiation pattern 142 and the connector 146 is formed on the extension substrate 147. Here, the flexible substrate 141 is formed of a substrate with a low dielectric constant (low dielectric dissipation factor) because antenna performance is reduced when it is made of a material generally used for the flexible printed circuit substrate.

Referring to FIG. 7, the portable terminal cover 200 according to the exemplary embodiment of the present disclosure is a substrate fastened to the portable terminal 10 to protect the portable terminal 10. The portable terminal cover 200 is fastened to the portable terminal 10 on which the antenna resonating in the UWB frequency band is not mounted to support the UWB band communication between the portable terminal 10 and the vehicle.

To this end, a UWB antenna 210 formed of the flexible printed circuit board (FPCB) and a signal processing circuit 220 configured to process signals transmitted and received by the UWB antenna 210 are embedded in the portable terminal cover 200. The portable terminal cover 200 can include a plurality of UWB antennas 210 having one radiation pattern formed thereon, or one UWB antenna 210 having two or more radiation patterns formed thereon.

The signal processing circuit 220 transmits the reception time of the signal received through the UWB antenna 210, the received signal strength, etc. to the portable terminal 10. The signal processing circuit 220 can detect the relative position of the portable terminal 10 and the vehicle using the reception time of the signal received through the UWB antenna 210, the received signal strength, etc.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. An antenna module comprising:
   a first antenna provided with a first radiation pattern resonating in a first frequency band; and
   a second antenna disposed on one surface of the first antenna and resonated in a UWB frequency band different from the first frequency band,
   wherein the first antenna comprises: a base substrate formed with the first radiation pattern and an extension substrate extending outward from the base substrate, and
   wherein the second antenna is disposed on an upper surface of the extension substrate,
   wherein the second antenna comprises:
   a base sheet disposed on an upper surface of the extension substrate;
   a second radiation pattern disposed on an upper surface of the base sheet;
   a ground pattern disposed on the upper surface of the extension substrate, a feeding pattern disposed on the upper surface of the base sheet, and connected to the second radiation pattern and a feeding source; and a connection pattern disposed on the upper surface of the base sheet, and connected to the ground pattern through a via hole to connect the second radiation pattern and the ground pattern.

2. The antenna module of claim 1, wherein the base substrate comprises:

a first extension substrate extending outward from one-side end of the base substrate; and a second extension substrate spaced apart from the first extension substrate by a set interval or more, and extending outward from another-side end of the base substrate.

3. The antenna module of claim 2, wherein the second antenna comprises:

a first UWB antenna disposed on an upper surface of the first extension substrate; and a second UWB antenna disposed on an upper surface of the second extension substrate.

\* \* \* \* \*